April 8, 1930.  P. P. CHAPIN ET AL  1,753,740

AUTOMATIC EGG BOILER

Filed Sept. 12, 1927

Patented Apr. 8, 1930

1,753,740

UNITED STATES PATENT OFFICE

PHILIP P. CHAPIN AND WILLIAM J. KUPEC, OF NEW YORK, N. Y.

AUTOMATIC EGG BOILER

Application filed September 12, 1927. Serial No. 218,974.

This invention relates to egg boilers that operate automatically to boil the eggs to a requisite cooked state. Its principal object is to provide a device for this purpose which will be simple, inexpensive, efficient, and particularly adaptable for home uses, as distinguished from clock-operated or expensive automatic egg boilers that are more adaptable for restaurants and commercial uses.

Another object is to provide an egg boiler with means for maintaining the water-vessel thereof covered during the boiling of the eggs, and which will automatically raise the cover upon completion of the egg boiling.

The invention herein is an improvement upon the egg boiler shown and described in our Letters Patent No. 1,623,093, dated April 5, 1927.

In carrying out this invention, advantage is taken of the natural principle that when heating a given quantity of water in a vessel over a constant source of heat, such as a gas burner or electric plate, it will require a definite length of time to bring up such body of water from a definite normal temperature to such high temperature as is required for completion of the proper boiling of the eggs. It has also been found that when placing an egg in cold water and then heating the water with a gas or electric burner, which is a more efficient way to cook eggs to soft-boiled state than by throwing the same into boiling water, the cooking process of the eggs will commence when the water reaches a certain critical temperature, and that the egg can then be brought up to proper soft-boiled state upon the water reaching a predetermined requisite higher temperature; provided however a definite period of time has been permitted to elapse between the said critical temperature of the water and its said higher temperature, so as to properly complete the cooking process. Such definite period of time can be supplied, in conjunction with any particular intensity of heat-source, by means of the provision of a predetermined volume of water at the commencement of the cooking, which volume is commensurate with such heat source. In carrying out the invention with the utilization of the aforesaid principles, a vessel is provided to hold the said predetermined volume of water, and an egg-carrying frame is mounted to slide upwardly and downwardly in said vessel. An air chamber constituting a float and forming part of said frame normally tends to lift the frame out of the water, and a detent operates to maintain the frame submerged contrary to the action of said float. A bimetallic thermostatic bar, which is submerged in said vessel, operates to release said detent and permit the float to lift said frame out of the water when it reaches the aforesaid higher temperature.

The specific apparatus embodying the invention is hereinafter fully shown and described, and other objects and advantages will hereinafter appear.

In the accompanying drawings,—

Figures 1, 2:
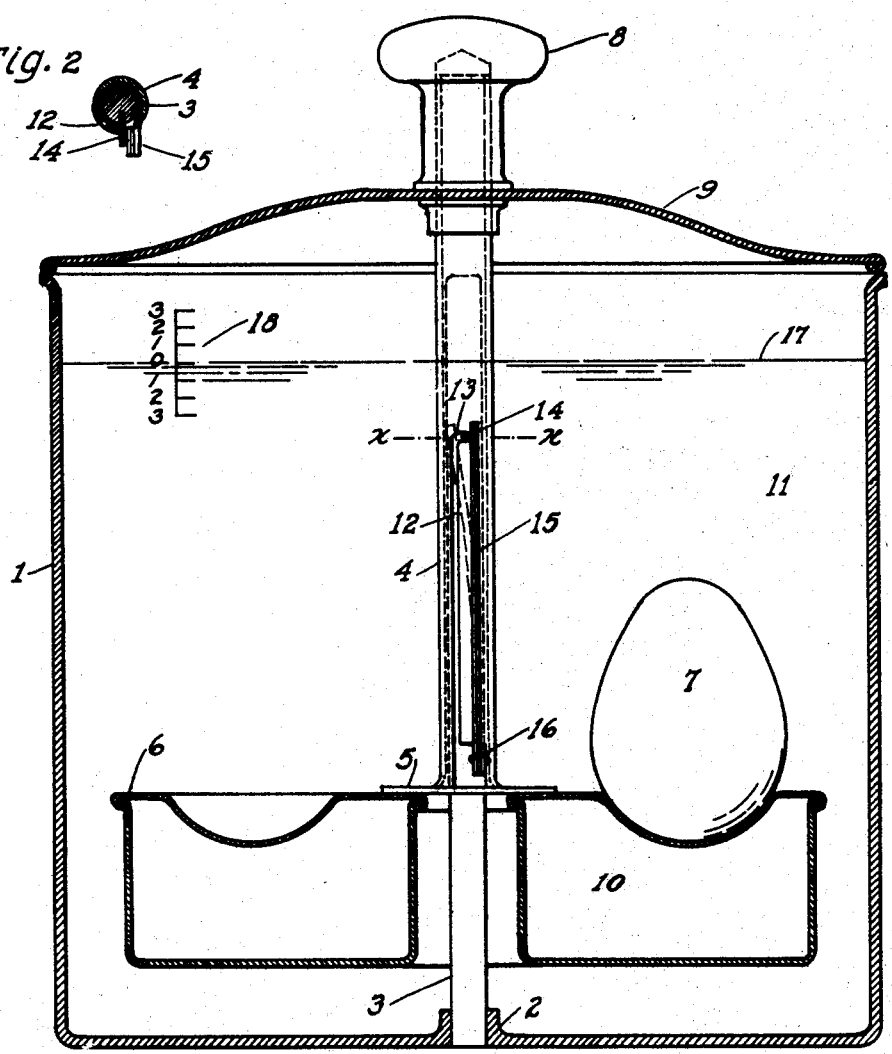
Fig. 1 shows a longitudinal cross-sectional elevation of the apparatus.
Fig. 2 is a cross-sectional plan view taken on the line x—x in Fig. 1.

A vessel 1 is adapted to hold the required predetermined volume of water, and it is provided with a central lug 2 at the bottom thereof, to which lug is secured a guiding-post 3. A tube 4 is telescopically slidable over the post 3 and is provided with a flange 5 to which is secured a carrying frame 6 adapted to hold one or more eggs 7. To the upper extremity of the tube 4 is fixed a knob 8 for the convenient manipulation of said tube and frame, and upon said tube is also mounted a cover 9 for the water-vessel 1. To the underside of the frame 6 is secured an annular buoyant air chamber 10, which surrounds the post 3 and acting constantly as a float normally tends to lift the frame 6 out of the water 11 and to simultaneously raise the cover 9 from the vessel 1. The tube 4 is provided with a vertical slot 12 having at its upper end a lateral branch or spur 13, and a pin 14 projecting from the post 3 passes through the slot 12 or the spur 13. When the knob 8 is depressed to its downward limit and turned slightly to the right, the pin 14 enters the spur 13 as shown and thereby locks the tube 4 and frame 6 in depressed state, contrary to the upward pressure of the float 10, and simultaneously maintains the cover 9 in the closed position shown.

A thermostatic bimetallic bar 15 is secured at 16 to the tube 4, and when the bar is in the submerged state it is disposed in the vertical position shown. As the water is being heated the bar 15 gradually flexes away from that position, in the manner shown by the dash and dot lines, and as it flexes it bears against the pin 14 and, slightly turning to the left all of the aforesaid movable parts about the post 3, it aligns the said pin with the slot 12, whereupon the tube 4 becomes released and the float 10 operates to elevate the frame 6 with the eggs out of the water and above its level 17, which elevating action is accomplished by the thermostat 15 when the water reaches the above mentioned predetermined requisite high cooking temperature. With the elevation of the eggs out of the water the cover 9 is simultaneously raised from the vessel 1.

When using the apparatus it requires merely the placing of the eggs in the frame 6 and submerging the frame with the eggs by pressing downwardly upon the knob 8 and turning it slightly toward the right, whereupon the pin 14 will lock the frame in depressed state. The vessel may be then placed over the usual gas burner or electric plate and the water heated in the usual manner, and when the water reaches its requisite predetermined high temperature the thermostat will automatically align the pin 14 with the slot 12 and the float will lift the eggs out of the water in properly cooked soft-boiled condition. It will be evident that instead of having to place the vessel upon a gas or electric heater, the bottom of the vessel may be permanently secured to or form direct part of such heated, in the manner of many well known gas and electric household appliances.

Before using the apparatus it is essential that the water in the vessel 1 should be of the predetermined required volume for the proper operation, and to aid in thus determining the proper water level in the vessel a gauge 18 is provided upon the inner side of the wall of the vessel, which gauge preferably bears a zero mark for the proper water level, as shown, with a plurality of graduations, above and below the zero mark, numbered 1, 2, 3, etc. In practice, the zero mark of the gauge is located at a point which will mark a volume of water which would be coincident with the proper cooking of the eggs to soft-boiled condition over an average household gas or electric heater, or by a heating device directly attached to the bottom of vessel 1. Should it subsequently be found by the user that his available heater cooks inefficiently because its heat capacity varies from the average to which the zero mark has been located, or because the user desires a higher or lower soft-boiled condition than the one to which the zero mark has been adjusted, he may then utilize a somewhat smaller or larger volume of water to bring the operation of the apparatus up to his requirements, and the user will be guided in this readjustment by the utilization of the graduated markings upon the gauge 18.

Variations may be resorted to within the scope of the invention.

Having thus described our invention, we claim:—

1. An egg boiler having the combination of a vessel for water, an egg carrier in said vessel, said carrier having a floating element to lift it out of the water, guiding means for the vertical movement of said carrier including a vertical slot having a lateral spur, a projection engaging said spur to maintain said carrier submerged contrary to the upward pressure of said element, and a thermostatic bar adapted to flex and align said projection with said slot to permit said element to move said carrier out of the water.

2. An egg boiler having the combination of a vessel for water, an egg carrier in said vessel, means to lift said carrier out of the water, guiding means for the vertical movement of said carrier including a vertical slot having a lateral spur, a projection engaging said spur to maintain said carrier submerged contrary to the upward pressure of said lifting means, and a thermostatic bar adapted to flex and align said projection with said slot to permit said lifting means to move said carrier out of the water.

Signed at the city of New York, in the county of New York, and State of New York, this 9th day of September, A. D. 1927.

PHILIP P. CHAPIN.
WILLIAM J. KUPEC.